United States Patent
Suzuki et al.

(10) Patent No.: US 9,479,760 B2
(45) Date of Patent: Oct. 25, 2016

(54) SOLID STATE IMAGING DEVICE, CALCULATING DEVICE, AND CALCULATING PROGRAM

(71) Applicant: Kabushiki Kaisha Toshiba, Minato-ku (JP)

(72) Inventors: Kazuhiro Suzuki, Minato (JP); Risako Ueno, Meguro (JP); Mitsuyoshi Kobayashi, Oota (JP); Honam Kwon, Kawasaki (JP); Hideyuki Funaki, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 290 days.

(21) Appl. No.: 14/451,835

(22) Filed: Aug. 5, 2014

(65) Prior Publication Data
US 2015/0077522 A1 Mar. 19, 2015

(30) Foreign Application Priority Data
Sep. 18, 2013 (JP) ................................ 2013-193295

(51) Int. Cl.
*H04N 15/00* (2006.01)
*H04N 13/02* (2006.01)
(Continued)

(52) U.S. Cl.
CPC ............. *H04N 13/0271* (2013.01); *G01S 5/00* (2013.01); *G01S 11/12* (2013.01); *G02B 3/0037* (2013.01); *G06T 7/0075* (2013.01); *H04N 5/2251* (2013.01); *H04N 13/0239* (2013.01);
(Continued)

(58) Field of Classification Search
None
See application file for complete search history.

(56) References Cited

U.S. PATENT DOCUMENTS 5,530,420 A * 6/1996 Tsuchiya ................. G01S 11/12
                                                        180/167
6,056,374 A * 5/2000 Hiwatashi .......... B60K 31/0008
                                                        180/169
(Continued)

FOREIGN PATENT DOCUMENTS

JP      2008-40115      2/2008
JP      2008-167154     7/2008
(Continued)

OTHER PUBLICATIONS

Combined Office Action and Search Report issued Sep. 2, 2015 in Taiwanese Patent Application No. 103126894 (with English language translation and English translation of categories of cited documents).

*Primary Examiner* — Frederick Bailey
*Assistant Examiner* — Talha M Nawaz
(74) *Attorney, Agent, or Firm* — Oblon, McClelland, Maier & Neustadt, L.L.P (57) ABSTRACT

According to one embodiment, a solid state imaging device includes a first imaging device, a second imaging device, and a calculating unit. The first imaging device includes a first optical system, a first imaging unit, and a second optical system provided between the first optical system and the first imaging unit. The second imaging device includes a third optical system, a second imaging unit, and a fourth optical system provided between the third optical system and the second imaging unit. The calculating unit is configured to perform a first calculation and a second calculation. The first calculation includes deriving a first distance from stereo disparity. The second calculation includes deriving a second distance from a parallax image. The calculating unit is configured to estimate a target distance based on at least one selected from the first distance and the second distance.

17 Claims, 9 Drawing Sheets

(51) Int. Cl.
- *H04N 13/04* (2006.01)
- *G02B 3/00* (2006.01)
- *G06T 7/00* (2006.01)
- *H04N 5/225* (2006.01)
- *G01S 5/00* (2006.01)
- *G01S 11/12* (2006.01)
- *H04N 13/00* (2006.01)

(52) U.S. Cl.
CPC ............ *G06T2207/10016* (2013.01); *H04N 2013/0081* (2013.01)

(56) References Cited

U.S. PATENT DOCUMENTS

| | | |
|---|---|---|
| 2010/0013969 A1 | 1/2010 | Ui |
| 2010/0073463 A1 | 3/2010 | Momonoi et al. |
| 2010/0182470 A1 | 7/2010 | Sugawa et al. |
| 2010/0188538 A1 | 7/2010 | Sugawa et al. |
| 2011/0025829 A1* | 2/2011 | McNamer ............ H04N 13/021 348/50 |
| 2011/0025871 A1 | 2/2011 | Yoshioka |
| 2011/0255775 A1* | 10/2011 | McNamer ............ G06T 7/0075 382/154 |
| 2012/0050589 A1 | 3/2012 | Ueno et al. |
| 2012/0057020 A1 | 3/2012 | Kobayashi et al. |
| 2012/0162374 A1* | 6/2012 | Markas ............ H04N 13/0221 348/46 |
| 2012/0218448 A1 | 8/2012 | Ueno et al. |
| 2012/0218454 A1 | 8/2012 | Suzuki et al. |
| 2012/0229683 A1 | 9/2012 | Kobayashi et al. |
| 2013/0075585 A1 | 3/2013 | Kobayashi et al. |
| 2013/0075586 A1 | 3/2013 | Ueno et al. |
| 2013/0075587 A1 | 3/2013 | Suzuki et al. |
| 2013/0075849 A1 | 3/2013 | Suzuki et al. |
| 2013/0169622 A1 | 7/2013 | Wu et al. |
| 2013/0240709 A1 | 9/2013 | Ueno et al. |
| 2013/0242161 A1 | 9/2013 | Kobayashi et al. |
| 2014/0118516 A1 | 5/2014 | Suzuki et al. |
| 2015/0103149 A1* | 4/2015 | McNamer ............ G06T 7/0075 348/50 |

FOREIGN PATENT DOCUMENTS

| | | |
|---|---|---|
| JP | 2009-165115 | 7/2009 |
| JP | 2010-78768 | 4/2010 |
| JP | 2010-210490 | 9/2010 |
| JP | 2012-198077 | 10/2012 |
| TW | 200920118 A | 5/2009 |
| TW | 200922309 A | 5/2009 |
| TW | 201326902 A1 | 7/2013 |

* cited by examiner

SOLID STATE IMAGING DEVICE, CALCULATING DEVICE, AND CALCULATING PROGRAM

CROSS-REFERENCE TO RELATED APPLICATIONS

This application is based upon and claims the benefit of priority from Japanese Patent Application No. 2013-193295, filed on Sep. 18, 2013; the entire contents of which are incorporated herein by reference.

FIELD

Embodiments described herein relate generally to a solid state imaging device, a calculating device, and a calculating program.

BACKGROUND

Various methods are being studied for imaging technology to obtain information (distance information) of the depth direction as two-dimensional array information such as technology using a reference beam, stereoscopic ranging technology using multiple cameras, etc. In particular, in recent years, the demand is increasing for relatively inexpensive products that can be used as novel input devices in consumer applications.

Among such imaging technology to obtain the distance information, methods that dose not use a reference beam for measuring are called passive methods. Passive methods include a parallax method based on triangulation, an image estimation method that estimates the distance from experience based on the configuration, contrast, and the like of the acquired image, etc. In particular, a parallax method has been proposed in which various calculation methods use a binocular configuration as the basis. For imaging technology that obtains the distance information using the parallax method, it is desirable to perform the distance measurement (the ranging) for a wide area with high precision.

DETAILED DESCRIPTION

According to one embodiment, a solid state imaging device includes a first imaging device, a second imaging device, and a calculating unit. The first imaging device includes a first optical system, a first imaging unit provided between the first optical system and an imaging position of the first optical system, the first imaging unit including a plurality of imaging pixels, and a second optical system provided between the first optical system and the first imaging unit, the second optical system including a first microlens array. The second imaging device is provided to be separated from the first imaging device. The second imaging device includes a third optical system, a second imaging unit provided between the third optical system and an imaging position of the third optical system, the second imaging unit including a plurality of imaging pixels, and a fourth optical system provided between the third optical system and the second imaging unit, the fourth optical system including a second microlens array. The calculating unit is configured to perform a first calculation and a second calculation. The first calculation includes deriving a first distance from stereo disparity using a first image signal and a second image signal. The first image signal is of an object as obtained by the first imaging device, and the second image signal is of the object as obtained by the second imaging device. The second calculation includes deriving a second distance from a parallax image obtained via at least one selected from the first microlens array and the second microlens array. The calculating unit is configured to estimate a target distance based on at least one selected from the first distance and the second distance.

Embodiments of the invention will now be described with reference to the drawings. In the description hereinbelow, similar members are marked with like reference numerals, and a description is omitted as appropriate for members once described.

First Embodiment

Figure 1:
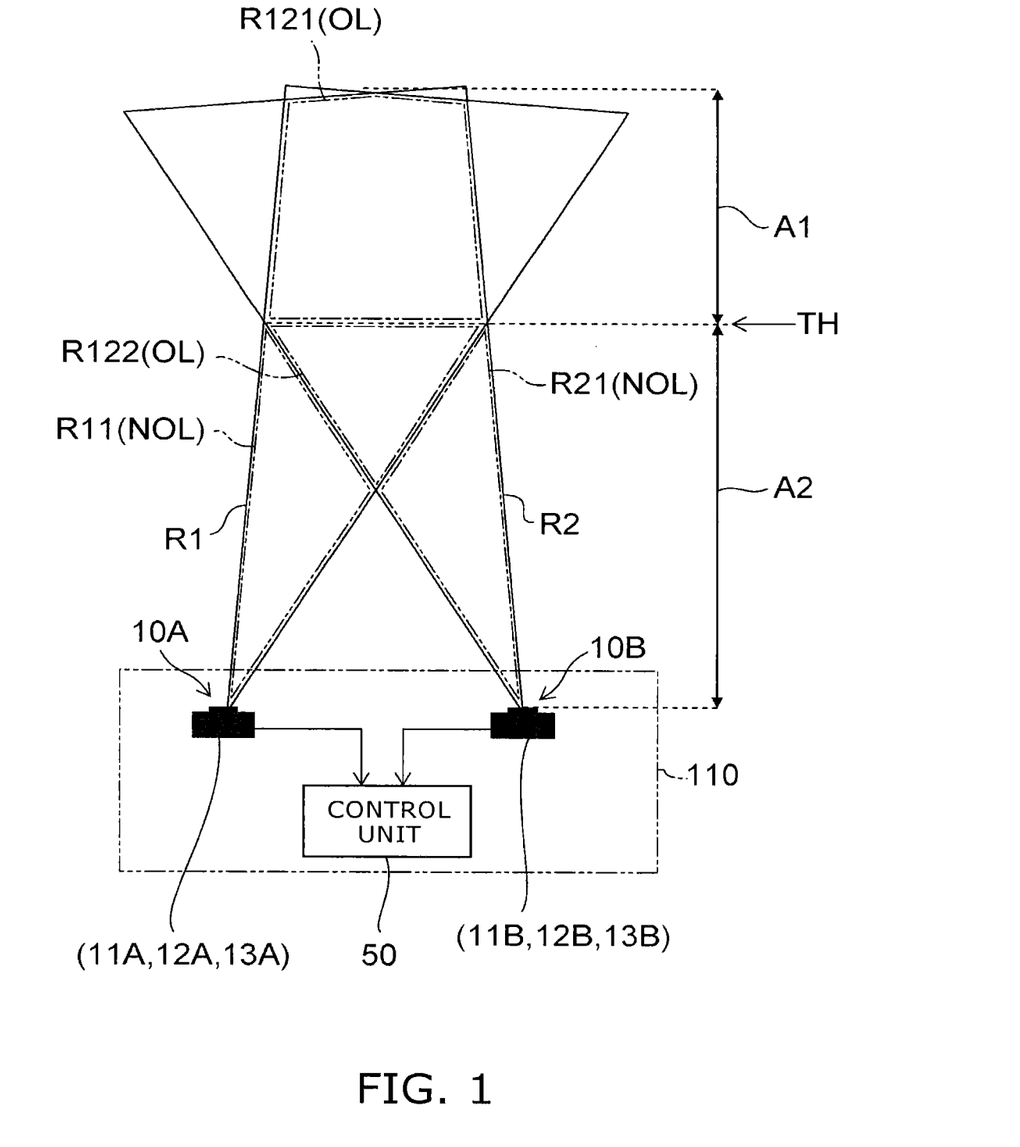
FIG. 1 is a schematic view illustrating a solid state imaging device according to a first embodiment.

FIG. 1 is a schematic view illustrating a solid state imaging device according to a first embodiment.

As shown in FIG. 1, the solid state imaging device 110 according to the embodiment includes a first imaging device 10A, a second imaging device 10B, and a calculating unit 50.

The first imaging device 10A includes a first main lens 11A included in a first optical system and a microlens array 12A included in a second optical system. The second imaging device 10B includes a second main lens 11B included in a third optical system and a microlens array 12B included in a fourth optical system. The first imaging device 10A and the second imaging device 10B are so-called plenoptic cameras. The detailed configurations of the first imaging device 10A and the second imaging device 10B are described below.

The calculating unit 50 performs a first calculation and a second calculation.

In the first calculation, a distance is derived (calculated) from stereo disparity using a first image signal of an object as obtained by the first imaging device 10A and a second image signal of the object as obtained by the second imaging device 10B.

In the second calculation, the distance is derived (calculated) from parallax images obtained via at least one selected from the first microlens array 12A and the second microlens array 12B.

For example, the first calculation is implemented in a first interval. The second calculation may be implemented in a second interval different from the first interval.

The solid state imaging device 110 performs a calculation (the first calculation) that includes acquiring a range image by stereo matching based on the image signals obtained by the first imaging device 10A and the second imaging device 10B and a calculation (the second calculation) that includes acquiring a range image by pattern matching based on a parallax image group obtained via at least one microlens array of the first imaging device 10A and the second imaging device 10B. The solid state imaging device 110 performs ranging with high precision in a wide area by appropriately selecting the first calculation and the second calculation.

Figure 2:
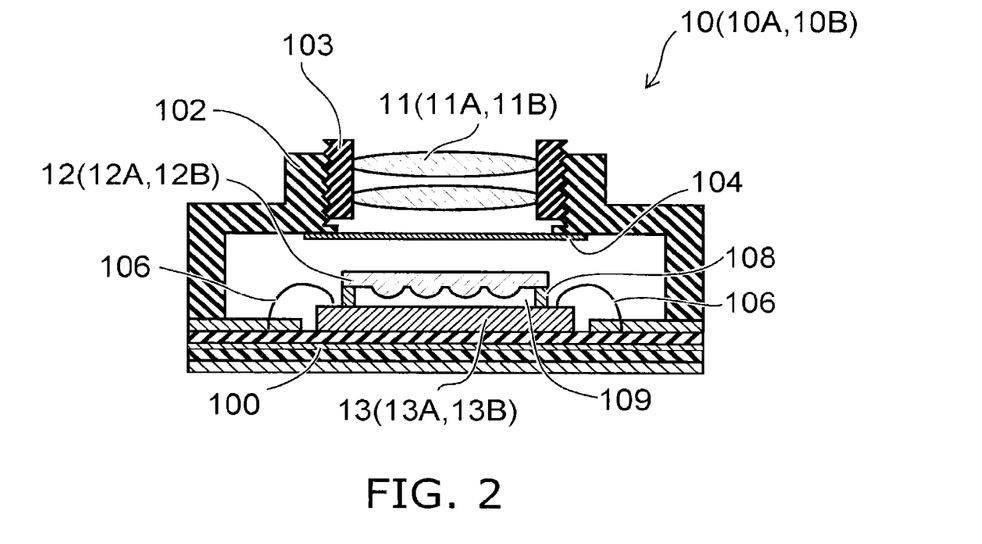
FIG. 2 is a schematic cross-sectional view illustrating the imaging device.

FIG. 2 is a schematic cross-sectional view illustrating the imaging device.

Because a common configuration is used for the configuration of the first imaging device 10A and the configuration of the second imaging device 10B, one imaging device 10 is illustrated in FIG. 2. In the following description, the configuration of the first imaging device 10A is marked with the reference numeral "A;" and the configuration of the second imaging device 10B is marked with the reference numeral "B." The reference numerals of "A" and "B" are omitted when not discriminating between the configuration of the first imaging device 10A and the configuration of the second imaging device 10B.

The imaging device 10 includes a main lens 11, a microlens array 12, and an imaging unit 13. In the first imaging device 10A, the main lens 11 is the first main lens 11A; the microlens array 12 is the first microlens array 12A; and the imaging unit 13 is a first imaging unit 13A. In the second imaging device 10B, the main lens 11 is the second main lens 11B; the microlens array 12 is the second microlens array 12B; and the imaging unit 13 is a second imaging unit 13B.

The main lens 11 includes one or more lenses. The imaging unit 13 is provided between the main lens 11 and the imaging position of the main lens 11. The imaging unit 13 includes not-shown multiple imaging pixels. The microlens array 12 is provided between the main lens 11 and the imaging unit 13.

The imaging unit 13 includes photodiodes which are the imaging pixels, a drive circuit that drives the photodiodes, a read-out circuit that reads the signals, etc., provided on a not-shown semiconductor substrate. The imaging unit 13 is cut into a chip configuration and mounted on a mounting substrate 100. The imaging unit 13 is electrically connected to a not-shown interconnect pattern of the mounting substrate 100 via a bonding wire 106.

The microlens array 12 is provided to be separated from the imaging unit 13. A bonding unit 108 is provided between the microlens array 12 and the imaging unit 13. A space 109 is set between the microlens array 12 and the imaging unit 13 by the bonding unit 108. A housing 102 is provided on the mounting substrate 100 to cover the microlens array 12, the imaging unit 13, and the bonding wire 106.

A lens holder 103 is mounted to the housing 102. The main lens 11 is mounted to the housing 102 by the lens holder 103. Thereby, the main lens 11 is disposed above the microlens array 12. A filter 104 may be provided between the main lens 11 and the microlens array 12 to block unnecessary light.

Figure 3:
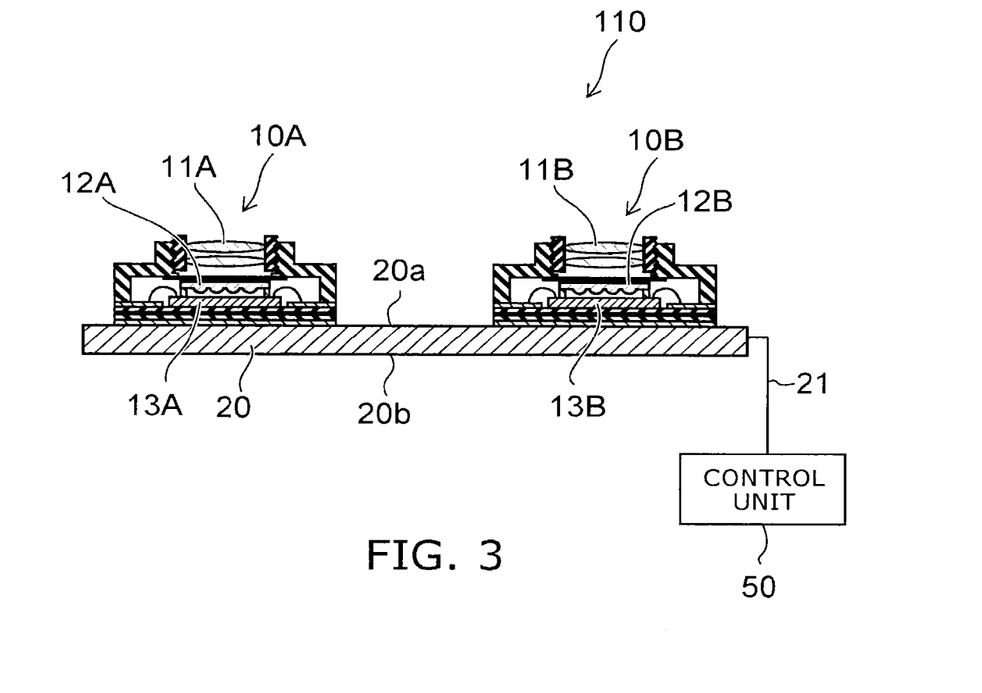
FIG. 3 is a schematic view illustrating the mounting state of the imaging devices.

FIG. 3 is a schematic view illustrating the mounting state of the imaging devices.

As shown in FIG. 3, the solid state imaging device 110 according to the embodiment may further include a substrate 20. The first imaging device 10A and the second imaging device 10B are mounted on a first surface 20a of the substrate 20 at a constant spacing.

The calculating unit 50 may be electrically connected to the first imaging device 10A and the second imaging device 10B via an interconnect 21. The calculating unit 50 may be mounted to the first surface 20a of the substrate 20 or a second surface 20b of the substrate 20 on the side opposite to the first surface 20a. The calculating unit 50 may be connected to the first imaging device 10A and the second imaging device 10B by wireless communication. The calculating unit 50 may be connected to the first imaging device 10A and the second imaging device 10B via a network such as the Internet, etc.

Ranging by the solid state imaging device 110 will now be described.

As shown in FIG. 1, the first imaging device 10A is capable of imaging the object inside a first imaging region R1. The second imaging device 10B is capable of imaging the object inside a second imaging region R2. The object inside an overlapping region OL where the first imaging region R1 and the second imaging region R2 overlap is imageable by both the first imaging device 10A and the second imaging device 10B.

On the other hand, the object inside a non-overlapping region (one other region) NOL where the first imaging region R1 and the second imaging region R2 do not overlap is imageable by one selected from the first imaging device 10A and the second imaging device 10B. For example, the object inside an imaging region R11 which is the non-overlapping region NOL in the first imaging region R1 is imageable by the first imaging device 10A. The object inside an imaging region R21 which is the non-overlapping region NOL in the second imaging region R2 is imageable by the second imaging device 10B.

For example, the calculating unit 50 selects the calculation result of the first calculation for the overlapping region OL and selects the calculation result of the second calculation for the non-overlapping region NOL. The calculating unit 50 may perform the first calculation and the second calculation for the overlapping region OL and perform the second calculation for the non-overlapping region NOL.

The calculating unit 50 may switch between the selection of the calculation result of the first calculation and the selection of the calculation result of the second calculation according to the distance from the solid state imaging device 110 to the object. For example, as shown in FIG. 1, a distance TH from the solid state imaging device 110 may be preset as a threshold; the calculation result of the first calculation may be selected for an area A1 beyond the distance TH; and the calculation result of the second calculation may be selected for an area A2 at or within the distance TH.

The calculating unit 50 may switch between the selection of the calculation result of the first calculation and the selection of the calculation result of the second calculation according to an instruction transmitted from outside the solid state imaging device 110.

In the solid state imaging device 110, both the advantages of the first calculation and the advantages of the second calculation are obtained by appropriately using the calculation result of the first calculation and the calculation result of the second calculation from the calculating unit 50.

A specific example of the ranging will now be described.

As shown in FIG. 1, the calculating unit 50 estimates the distance by the first calculation for an imaging region R121 that is sufficiently distal to the solid state imaging device 110 and is in the overlapping region OL where the first imaging region R1 of the first imaging device 10A and the second imaging region R2 of the second imaging device 10B overlap. In other words, the calculating unit 50 estimates the distance by stereo matching by forming a reconstruction image based on the image signals obtained by the first imaging device 10A and the second imaging device 10B. The reconstruction of the images and the stereo matching are described below.

On the other hand, the calculating unit 50 estimates the distance by at least one selected from the first calculation and the second calculation for an imaging region R122 that is relatively proximal to the solid state imaging device 110 and is in the overlapping region OL. In the second calculation, the distance is estimated by pattern matching using the parallax image group obtained by the imaging unit 13 via at least one selected from the first microlens array 12A of the first imaging device 10A and the second microlens array 12B of the second imaging device 10B. The ranging using the parallax image group is described below.

Further, the calculating unit 50 estimates the distance by the second calculation for the imaging region R11 that is in the non-overlapping region NOL and is in the first imaging region R1 of the first imaging device 10A. In other words, the calculating unit 50 estimates the distance by pattern matching using the parallax image group obtained by the first imaging unit 13A via the first microlens array 12A of the first imaging device 10A.

The calculating unit 50 estimates the distance by the second calculation for the imaging region R21 that is in the non-overlapping region NOL and is in the second imaging region R2 of the second imaging device 10B. In other words, the calculating unit 50 estimates the distance by pattern matching using the parallax image group obtained by the second imaging unit 13B via the second microlens array 12B of the second imaging device 10B.

Thus, for the first imaging region R1 and the second imaging region R2 in the solid state imaging device 110, ranging for the non-overlapping region NOL is performed in addition to the ranging for the overlapping region OL. Accordingly, the ranging is realized for a wide area. The ranging is performed by stereo matching by the first calculation in relatively distal areas; and the ranging is performed by pattern matching using a parallax image group by the second calculation in relatively proximal areas. Thereby, high-precision ranging in proximal and distal areas is realized.

Figure 4:
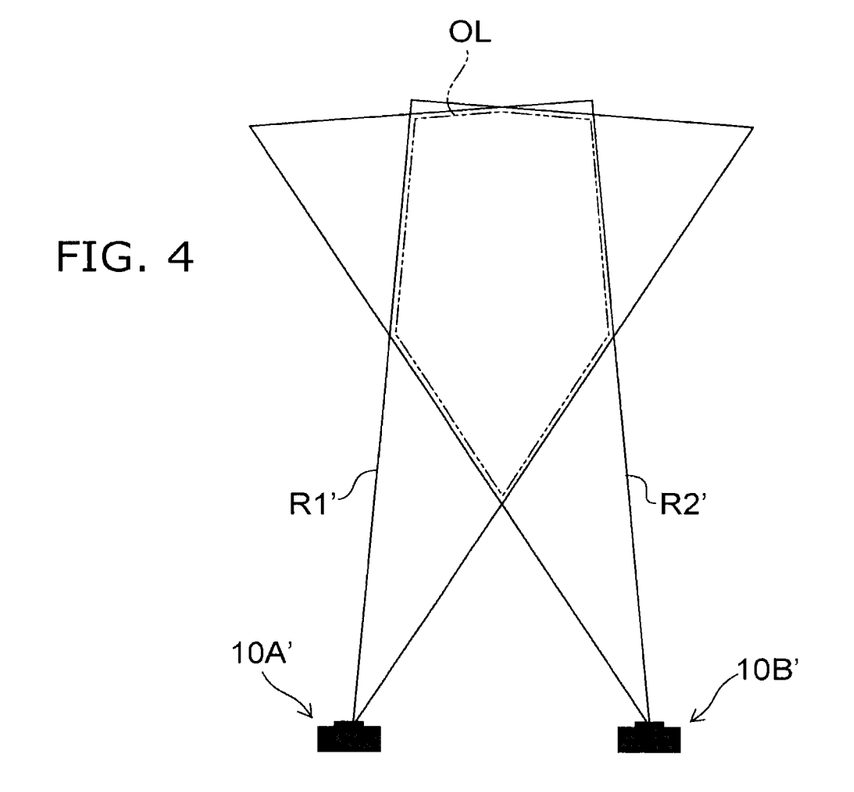
FIG. 4 is a schematic view illustrating ranging according to a reference example.

FIG. 4 is a schematic view illustrating ranging according to a reference example.

In the example shown in FIG. 4, the ranging is performed by stereo matching using the image signals obtained by a first imaging device 10A' and a second imaging device 10B'. The first imaging device 10A' and the second imaging device 10B' are cameras that are not plenoptic cameras.

In the example shown in FIG. 4, the area where it is possible to acquire the range image is limited to the overlapping region OL where a first imaging region R1' of the first imaging device 10A' and a second imaging region R2' of the second imaging device 10B' overlap. Accordingly, the range image cannot be acquired for the regions other than the overlapping region OL.

On the other hand, in the solid state imaging device 110 according to the embodiment as described above, the range image can be acquired not only for the overlapping region OL but also for the non-overlapping region NOL. Accordingly, in the solid state imaging device 110, the range image is obtained for a wide area.

The method for estimating the distance by stereo matching will now be described.

Figure 5:
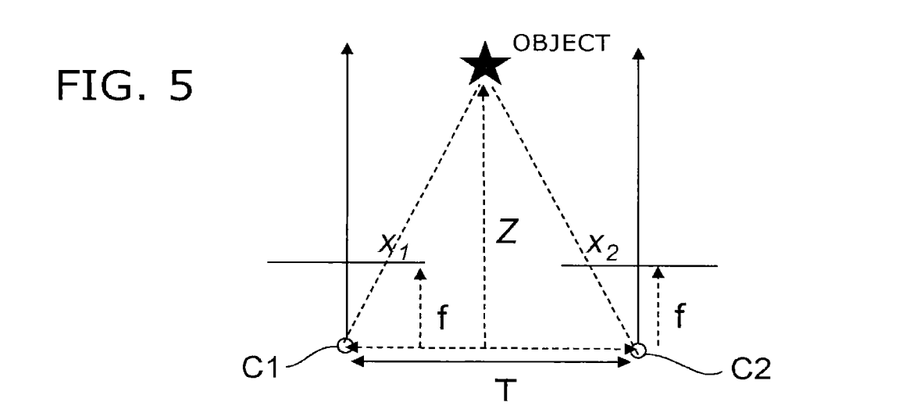
FIG. 5 shows the concept of the estimation of the distance based on stereo disparity.

FIG. 5 shows the concept of the estimation of the distance based on stereo disparity.

In FIG. 5, Z is the distance; f is the focal distance of the camera; T is the spacing (the baseline length) between left and right cameras C1 and C2; and d is the parallax distance (x1−x2).

The distance Z is expressed in the following Formula (1) using the parallax distance d which is the shift of the position of the same object at the imaging plane as imaged by the left and right cameras C1 and C2.

$$Z = \frac{fT}{d} \tag{1}$$

As recited above, the distance Z based on stereo disparity is calculated by Formula (1) recited above based on the parallax obtained by matching any image region between one image and one other image corresponding to the one image, where the one image and the one other image are imaged by the two cameras C1 and C2.

The method for estimating the distance using the parallax image group will now be described.

Figure 6A:
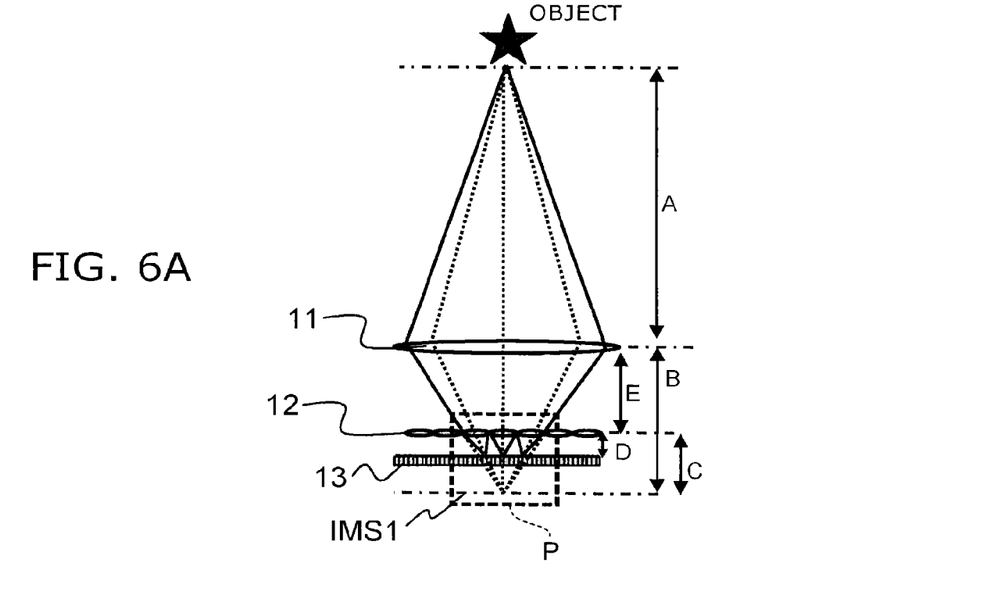
FIG. 6A and FIG. 6B show the concept of the method for estimating the distance using the parallax image group.
Figure 6B:
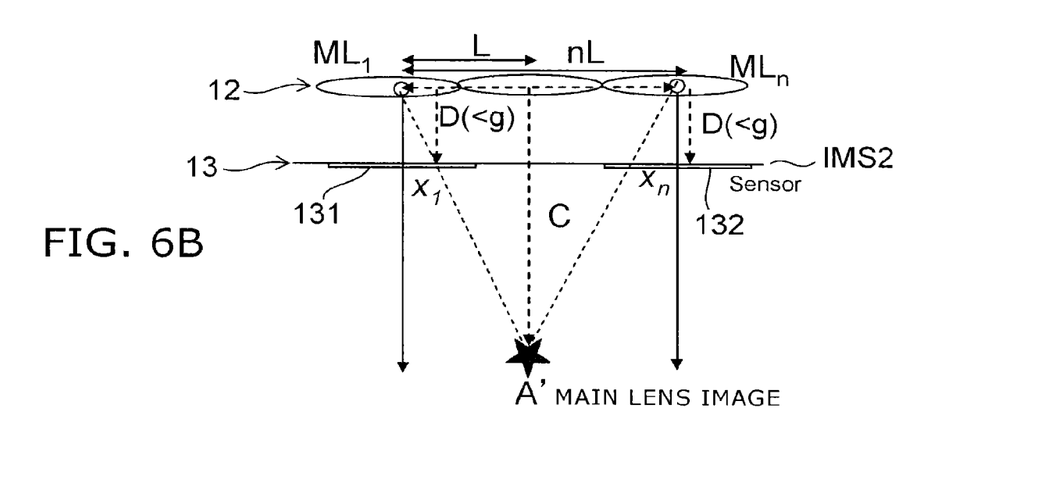

FIG. 6A and FIG. 6B show the concept of the method for estimating the distance using the parallax image group.

FIG. 6B is an enlarged view of portion P shown in FIG. 6A.

In FIG. 6A and FIG. 6B, A is the distance (the distance to the object from the major surface of the main lens 11 on the object side); f is the focal distance of the main lens 11; B is the distance from the major surface of the main lens 11 on the image side to an imaging plane IMS1; C is the distance to the imaging plane IMS1 of the main lens 11 from the major surface on the object side of microlenses ML included in the microlens array 12; D is the distance from the major surface of the microlenses ML on the image side to an imaging plane IMS2 of the microlenses ML; E is the distance (E=B−C) from the major surface of the main lens 11 on the image side to the major surface of the microlenses ML on the object side; d is the parallax distance of the microlenses ML; nL is the baseline length; L is the pitch (L≈the diameter of the microlenses ML) of the microlenses ML; and g is the focal distance of the microlenses ML.

The distance C from the major surface of the microlenses ML on the object side to the imaging plane IMS1 of the main lens 11 is expressed in the following Formula (2).

$$C = \frac{DnL}{d} \tag{2}$$

The parallax distance d is expressed in the following Formula (3).

$$d = (x_1 - x_n) \tag{3}$$

The distance B from the major surface of the main lens 11 on the image side to the imaging plane IMS1 is expressed in the following Formula (4) which is a relational expression between the focal distance f of the main lens 11 and the distance A to the object from the major surface of the main lens 11 on the object side.

$$B = \frac{fA}{A-f} \quad (4)$$

Here, the distance C is expressed in the following Formula (5).

$$C = B - E \quad (5)$$

Formula (2), Formula (4), and Formula (5) can be combined as the following Formula (6).

$$\frac{DnL}{d} = \frac{fA}{A-f} - E \quad (6)$$

Accordingly, the distance A to the object from the major surface of the main lens 11 on the object side is derived from Formula (6) recited above and from D, nL, d, f, and E which are known.

The reconstruction of the images will now be described.

As in the solid state imaging device 110 of the embodiment, the reconstruction of the images is performed to perform the ranging based on the parallax based on the image signal obtained by the imaging unit 13 via the microlens array 12.

As in the solid state imaging device 110 of the embodiment, when multiple microlenses subdivide a light beam group emitted from the same imaging object and image the subdivided light beam group on an imaging pixel plane positioned in front of the virtual imaging plane, the same imaging object is multiply imaged according to the parallax. Accordingly, the microlens image group that is made by multiply imaging the same imaging object unit is output as the image. The microlens image group has a relationship such that the image that would be imaged at the virtual imaging plane is reduced by the microlens imaging system by an image magnification N. The image magnification N is expressed in the following Formula (7).

$$N = \frac{D}{C} \quad (7)$$

The microlens image group that is obtained is reconstructed into a two-dimensional image without overlapping areas by reconstruction processing of the data read for each of the microlens images. Because the microlens image group that is obtained has parallax equal to or less than the imaging lens diameter, the microlens image group that is obtained is utilized in 3D stereo image processing that utilizes the parallax.

In the solid state imaging device 110 according to the embodiment, distance estimation using the stereo disparity and distance estimation using the parallax image group obtained from the microlenses can be obtained. For any distance region, either of the two distance estimations or both of the two distance estimations are applied. Thereby, the dead angle region can be reduced; and the acquisition of a high-precision range image from proximal distances to distal distances is possible.

The calculating unit 50 will now be described.

The calculating unit 50 performs the ranging based on the first image signal of the object as obtained by the first imaging device 10A and the second image signal of the object as obtained by the second imaging device 10B. The calculating unit 50 may include hardware or may include software. The calculating unit 50 may include both hardware and software. In the description described below, processing in which the calculating unit 50 includes software (a calculating unit program) is described.

Figure 7:
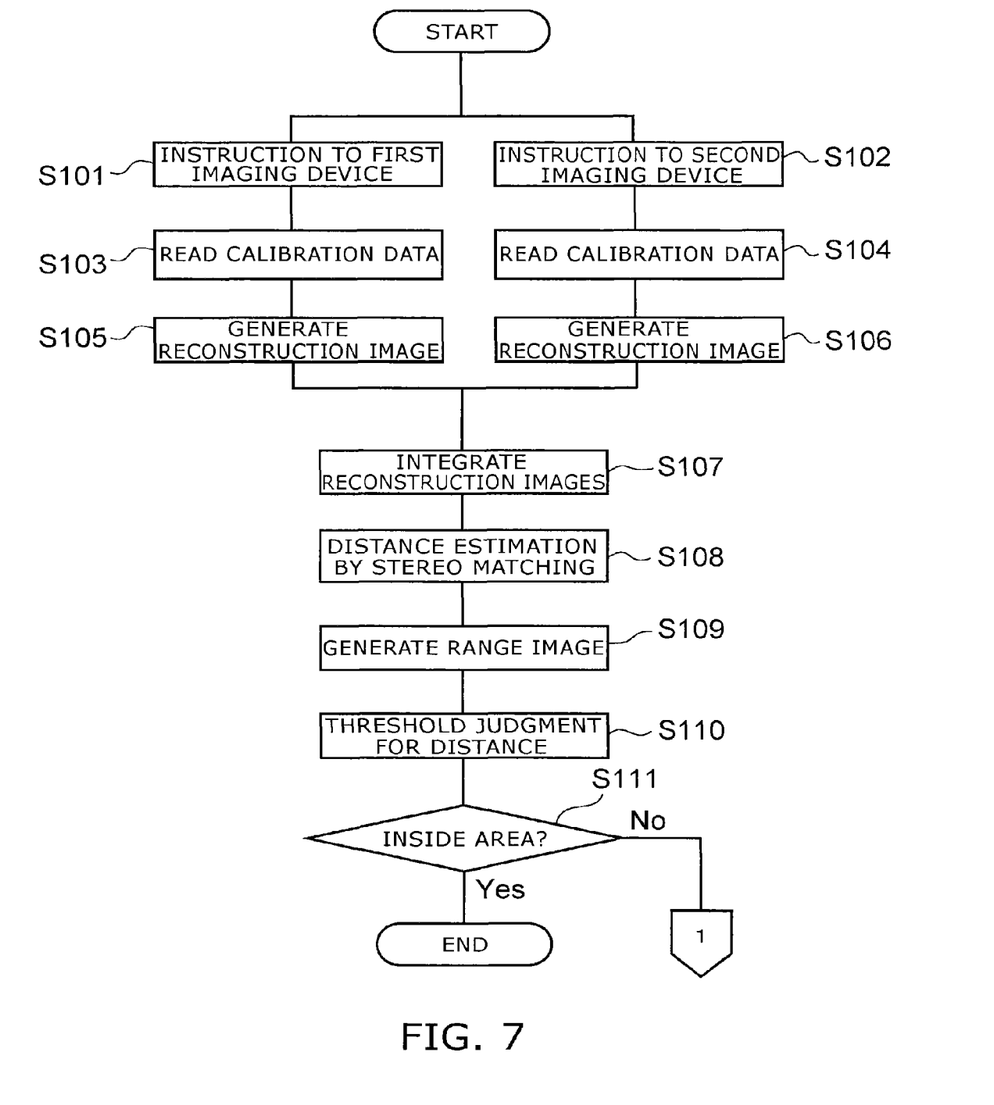
FIG. 7 is a flowchart illustrating the flow of the calculating program.
Figure 8:
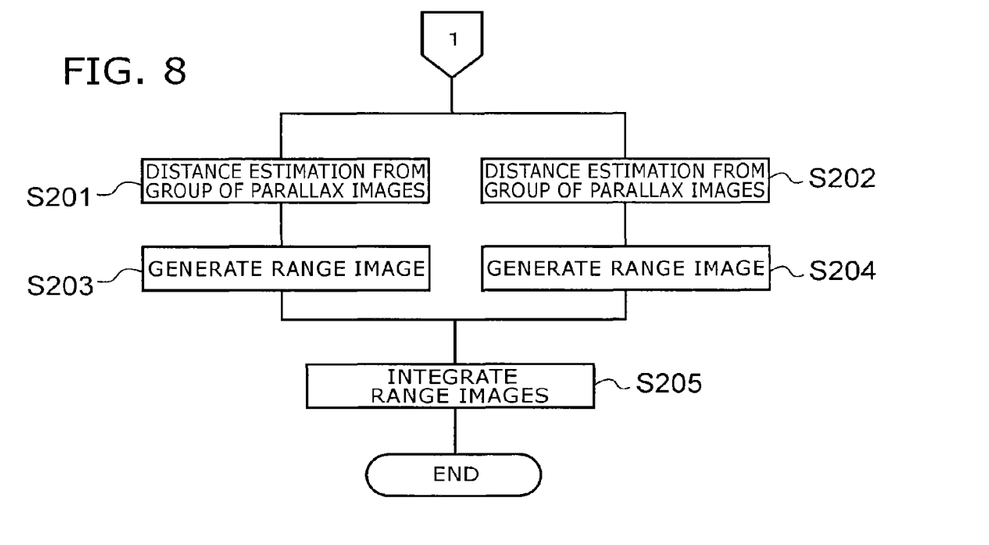
FIG. 8 is a flowchart illustrating the flow of the calculating program.

FIG. 7 and FIG. 8 are flowcharts illustrating the flow of the calculating program.

FIG. 7 shows the flow of the processing of the first calculation; and FIG. 8 shows the flow of the processing of the second calculation.

First, as shown in FIG. 7, instructions are provided for the imaging by the first imaging device 10A (step S101) and the imaging by the second imaging device 10B (step S102). Then, for example, the reading of calibration data including raw data from the first imaging device 10A (step S103) and, for example, the reading of calibration data including raw data from the second imaging device 10B (step S104) are performed.

Then, the generation of a reconstruction image from the calibration data of the first imaging device 10A (step S105) is performed. The first image signal is included in the reconstruction image. The generation of a reconstruction image from the calibration data of the second imaging device 10B (step S106) is performed. The second image signal is included in the reconstruction image.

Then, the reconstruction image that includes the first image signal and the reconstruction image that includes the second image signal are integrated (step S107). The image that is integrated may be displayed as necessary by an external display device (display).

Continuing, the estimation of the distance by stereo matching (step S108) is performed. Here, the distance is derived from the stereo disparity using the reconstruction image including the first image signal and the reconstruction image including the second image signal. Then, the range image is generated (step S109).

Then, the estimated distance and the pre-set threshold are compared (step S110). The distance that is estimated is determined to be inside the stereo distance estimation reference area in the case where the distance that is estimated exceeds a threshold (step S111). In the case where the distance is determined to be inside the stereo distance estimation reference area, the range image generated in step S109 is selected. The range image that is selected is output to the outside as necessary. The processing of step S109 is omissible in the case where the value of the estimated distance can be obtained without the range image.

On the other hand, in the case where the estimated distance is not more than the threshold, the flow proceeds to the flowchart shown in FIG. 8. As shown in FIG. 8, first, the distance is estimated from the group of the parallax images obtained for each of the microlenses of the first imaging device 10A (step S201). The distance is estimated from the group of the parallax images obtained for each of the microlenses of the second imaging device 10B (step S202). In other words, the distance is estimated from the group of the parallax images obtained for each of the microlenses based on the parallax of the microlens image group from the calibration data of the first imaging device 10A. Similarly, the distance is estimated from the group of the parallax images obtained for each of the microlenses based on the parallax of the microlens image group from the calibration data of the second imaging device 10B.

Then, the range image is generated from the estimation result of the distance from the group of the parallax images obtained for each of the microlenses (step S203 and step S204). Then, the range image that is obtained by the first imaging device 10A and the range image that is obtained by the second imaging device 10B are integrated (step S205). The integrated range image is output to the outside as necessary. The processing of step S203 and the processing of step S204 are omissible in the case where the estimated distance can be obtained without the range images. In the case where the range image is to be obtained by one selected from the first imaging device 10A and the second imaging device 10B, one selected from a first processing that includes the processing of step S201 and the processing of step S203 and a second processing that includes the processing of step S202 and the processing of step S204 may be executed. In such a case, the processing of step S205 may not be executed.

By such processing, ranging for a wide area is realized; and high-precision ranging is realized for both the case where the distance to the object is distal and the case where the distance to the object is proximal.

The calculating unit 50 may perform the processing (the second calculation) shown in FIG. 8 and the processing (the first calculation) shown in FIG. 7 in parallel. For example, parallel processing of the program of the first calculation shown in FIG. 7 and the program of the second calculation shown in FIG. 8 may be performed using hardware that is capable of multitasking.

The calculating program described above is executed by a computer.

Figure 9:
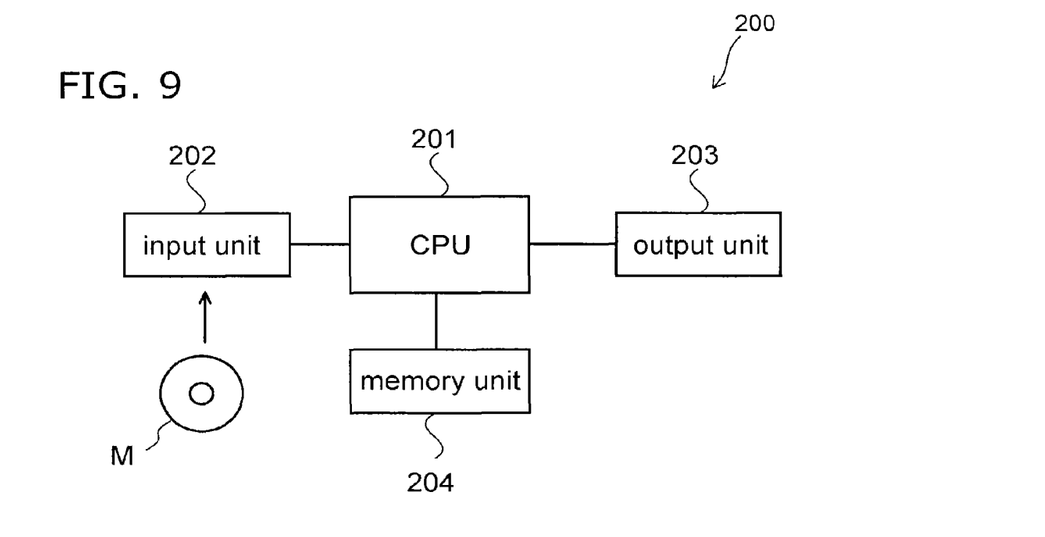
FIG. 9 illustrates hardware of the computer.

FIG. 9 illustrates hardware of the computer.

The computer 200 includes a central processing unit 201, an input unit 202, an output unit 203, and a memory unit 204. The input unit 202 includes the function of reading information recorded in a recording medium M. The calculating program described above is executed by the central processing unit 201.

The calculating program causes the computer 200 to execute the processing of each of the steps shown in FIG. 7 and FIG. 8.

The calculating program may be recorded in a computer-readable recording medium. The recording medium M records the processing of each of the steps shown in FIG. 7 and FIG. 8 in a format that is readable by the computer 200.

In other words, the recording medium M records the calculating program that controls the solid state imaging device including the first imaging device 10A and the second imaging device 10B.

The first imaging device 10A includes the first main lens 11A which is the first optical system, the first imaging unit 13A that is provided between the first main lens 11A and the imaging position of the first main lens 11A and includes multiple imaging pixels, and the second optical system that is provided between the first main lens 11A and the first imaging unit 13A and includes the first microlens array 12A.

The second imaging device 10B is provided to be separated from the first imaging device 10A.

The second imaging device 10B includes the second main lens 11B which is the third optical system, the second imaging unit 13B that is provided between the second main lens 11B and the imaging position of the second main lens 11B and includes multiple imaging pixels, and the fourth optical system that is provided between the second main lens 11B and the second imaging unit 13B and includes the second microlens array 12B.

The recording medium M records a program that causes a computer to execute first calculation processing and second calculation processing, where the first calculation processing includes deriving the distance from the stereo disparity using the first image signal of the object as obtained by the first imaging device 10A and the second image signal of the object as obtained by the second imaging device 10B, and the second calculation processing includes deriving the distance from the parallax images obtained via at least one selected from the first microlens array 12A and the second microlens array 12B.

The recording medium M may be a memory device such as a server, etc., connected to a network. The calculating program may be distributed via the network.

Second Embodiment

A second embodiment will now be described.

Figure 10A:
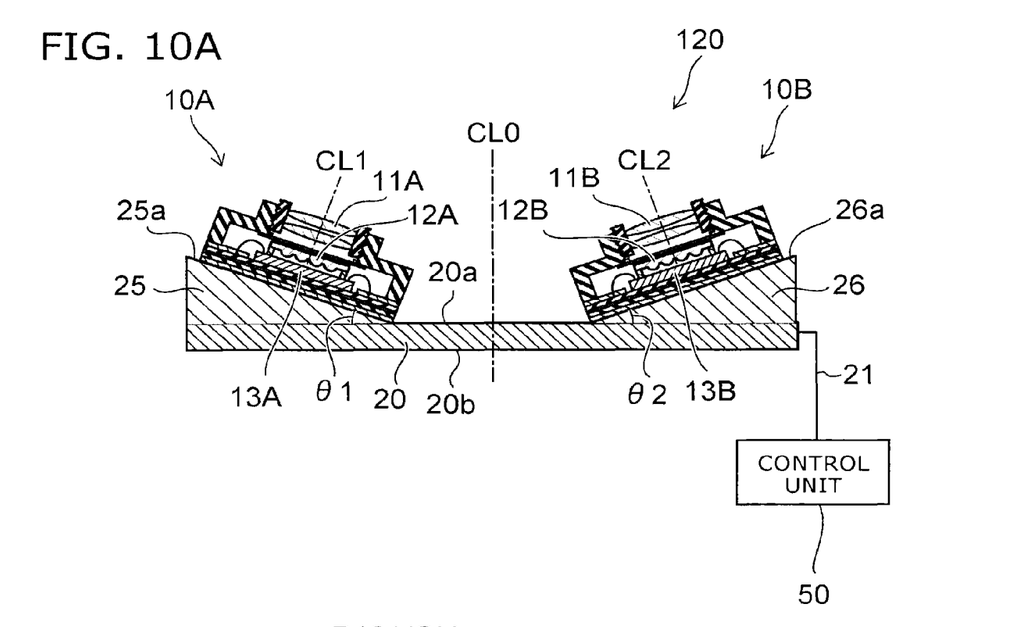
FIG. 10A and FIG. 10B are schematic views illustrating the solid state imaging device according to the second embodiment.
Figure 10B:
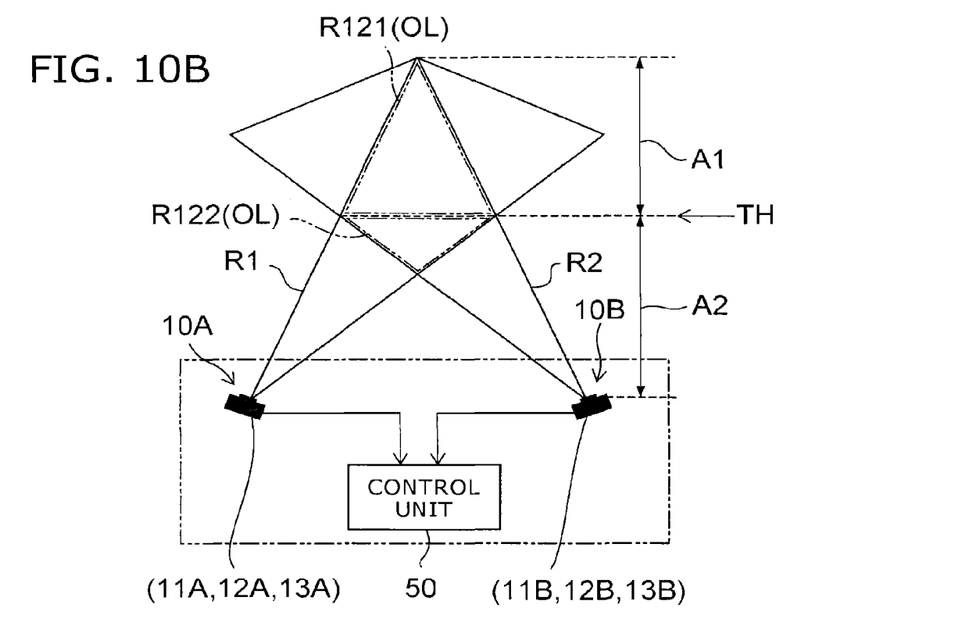

FIG. 10A and FIG. 10B are schematic views illustrating the solid state imaging device according to the second embodiment.

FIG. 10A shows an example of the solid state imaging device 120 according to the second embodiment. FIG. 10B shows the concept of the ranging by the solid state imaging device 120 according to the second embodiment.

As shown in FIG. 10A, the solid state imaging device 120 according to the embodiment includes the first imaging device 10A, the second imaging device 10B, and the calculating unit 50. In the solid state imaging device 120, an optical axis CL1 of the first main lens 11A included in the first optical system of the first imaging device 10A is non-parallel to an optical axis CL2 of the second main lens 11B included in the third optical system of the second imaging device 10B. Otherwise, the configuration is similar to that of the solid state imaging device 110.

The solid state imaging device 120 includes, for example, the substrate 20, a first tilted table 25, and a second tilted table 26. The first tilted table 25 and the second tilted table 26 are provided on the first surface 20a of the substrate 20. A first tilted surface 25a of the first tilted table 25 is tilted with respect to the first surface 20a of the substrate 20. A second tilted surface 26a of the second tilted table 26 is tilted with respect to the first surface 20a of the substrate 20.

The first imaging device 10A is mounted on the first tilted surface 25a. The second imaging device 10B is mounted on the second tilted surface 26a. The first imaging device 10A and the second imaging device 10B are disposed to be tilted toward a central axis CL0 side (inward), where the central axis CL0 is an axis orthogonal to the first surface 20a at the middle between the first imaging device 10A and the second imaging device 10B.

In the solid state imaging device 120 as shown in FIG. 10B, images at prescribed angles with respect to the central axis CL0 are obtained by the first imaging device 10A and the second imaging device 10B. Thereby, the overlapping region OL of the first imaging region R1 and the second imaging region R2 can be different from the overlapping region OL shown in FIG. 1.

In the solid state imaging device 120, a first angle $\theta1$ of the first tilted surface 25a and a second angle $\theta2$ of the second tilted surface 26a may be modifiable. The first angle $\theta1$ is the angle of the first tilted surface 25a with respect to the first surface 20a of the substrate 20. The second angle $\theta2$ is the angle of the second tilted surface 26a with respect to the first surface 20a of the substrate 20. The angle of the optical axis CL1 of the first imaging device 10A is set by the first angle $\theta1$; and the angle of the optical axis CL2 of the second imaging device 10B is set by the second angle $\theta2$.

The calculating unit 50 may control the first angle $\theta1$ and the second angle $\theta2$ independently. Thereby, the first imaging region R1, the second imaging region R2, and the overlapping region OL can be adjusted. In the solid state imaging device 120, the first imaging device 10A and the second imaging device 10B may be disposed to be tilted away from the central axis CL0 (outward).

Third Embodiment

A third embodiment will now be described.

Figure 11:
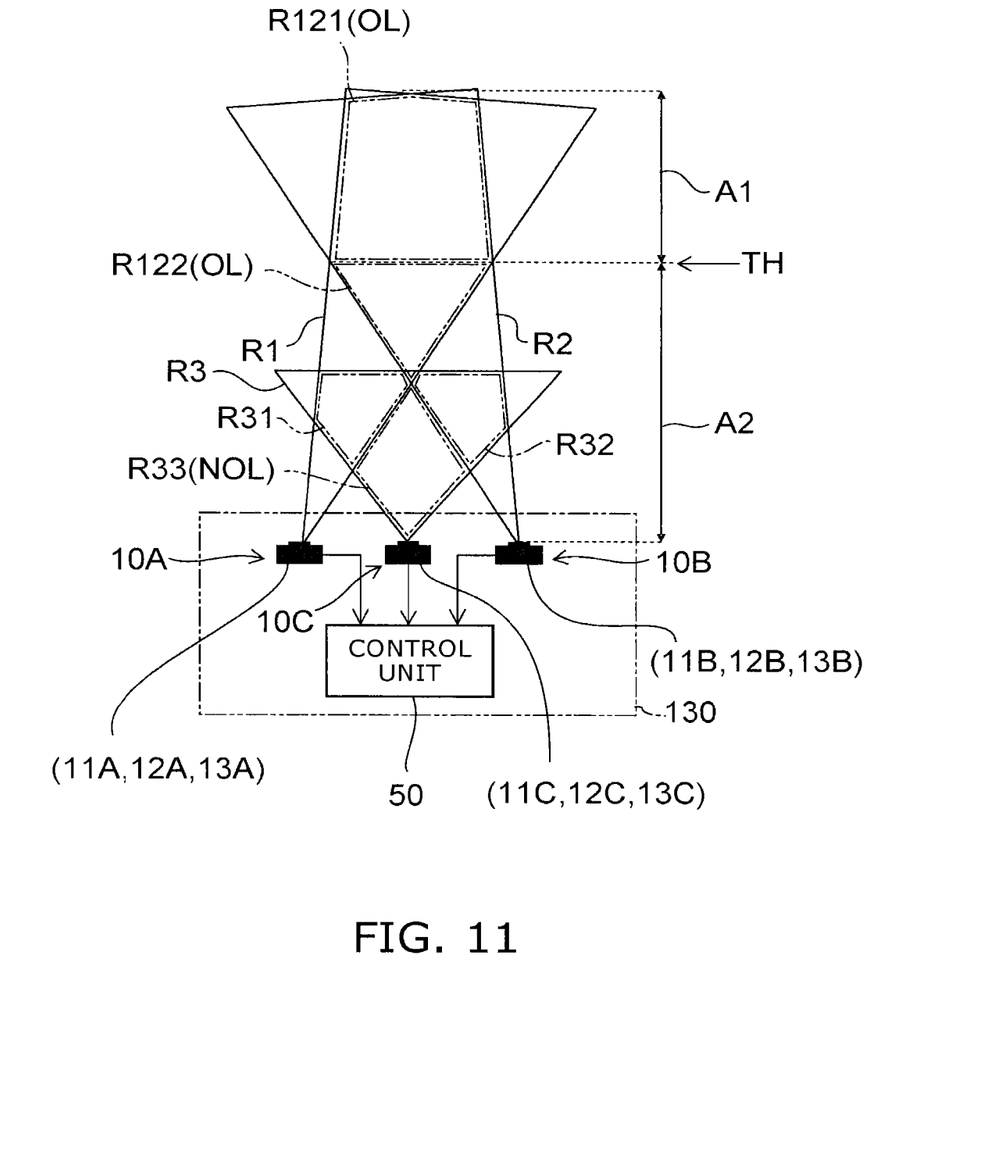
FIG. 11 is a schematic view illustrating a solid state imaging device according to the third embodiment.

FIG. 11 is a schematic view illustrating a solid state imaging device according to the third embodiment.

As shown in FIG. 11, the solid state imaging device 130 according to the embodiment includes the first imaging device 10A, the second imaging device 10B, a third imaging device 10C, and the calculating unit 50. In other words, in the solid state imaging device 130, the third imaging device 10C is added to the solid state imaging device 110. Otherwise, the configuration is similar to that of the solid state imaging device 110.

The third imaging device 10C is provided between the first imaging device 10A and the second imaging device 10B. The configuration of the third imaging device 10C is similar to the configuration of the first imaging device 10A and the configuration of the second imaging device 10B. In other words, the third imaging device 10C includes a third main lens 11C that is included in a fifth optical system, a third imaging unit 13C that includes multiple imaging pixels, and a third microlens array 12C that is included in a sixth optical system.

The third imaging unit 13C is provided between the third main lens 11C and the imaging position of the third main lens 11C. The third microlens array 12C is provided between the third main lens 11C and the third imaging unit 13C. A third imaging region R3 of the third imaging device 10C is wider than the first imaging region R1 of the first imaging device 10A and the second imaging region R2 of the second imaging device 10B and is on the proximal distance side.

The solid state imaging device 130 can obtain the image of an imaging region R33 that is not included in the first imaging region R1 and the second imaging region R2. The calculating unit 50 derives the distance of the object inside the imaging region R33 from parallax images obtained via the third microlens array 12C of the third imaging device 10C.

For an overlapping region R31 of the first imaging region R1 and the third imaging region R3, the calculating unit 50 may derive the distance by stereo matching by forming reconstruction images based on the image signals obtained by the first imaging device 10A and the third imaging device 10C, or may derive the distance from parallax images obtained via the third microlens array 12C.

For an overlapping region R32 of the second imaging region R2 and the third imaging region R3, the calculating unit 50 may derive the distance by stereo matching by forming reconstruction images based on image signals obtained by the second imaging device 10B and the third imaging device 10C, or may derive the distance from the parallax images obtained via the third microlens array 12C.

In the solid state imaging device 130, the distance can be derived with high precision for a wider area by the first imaging device 10A, the second imaging device 10B, and the third imaging device 10C. Although an example is illustrated for the solid state imaging device 130 shown in FIG. 11 in which three imaging devices 10 are used, the distance may be derived using more imaging devices 10.

Fourth Embodiment

A fourth embodiment will now be described.

Figure 12:
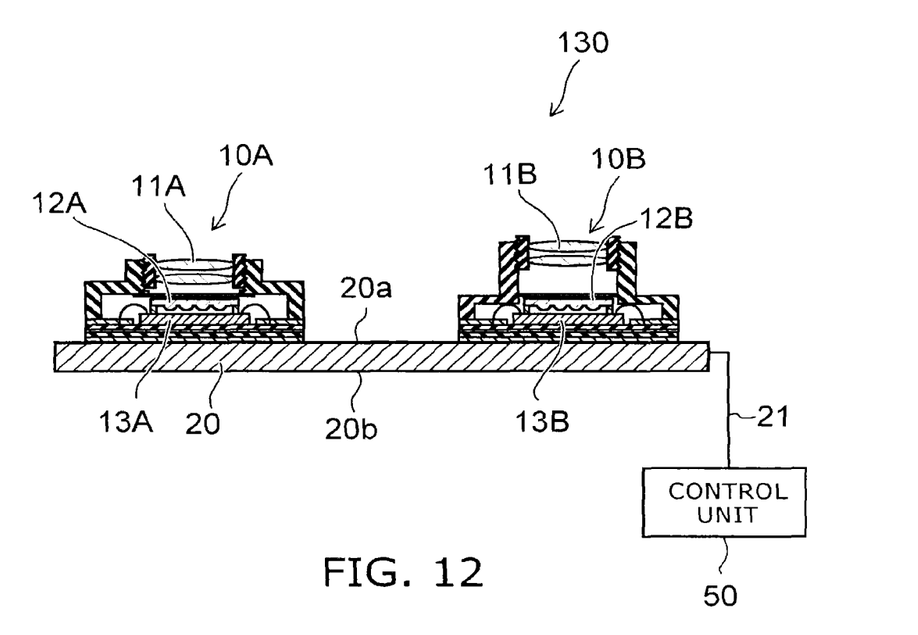
FIG. 12 is a schematic view illustrating a solid state imaging device according to the fourth embodiment.

FIG. 12 is a schematic view illustrating a solid state imaging device according to the fourth embodiment.

As shown in FIG. 12, the solid state imaging device 130 according to the embodiment includes the first imaging device 10A, the second imaging device 10B, and the calculating unit 50. In the solid state imaging device 130, the focal distance of the first main lens 11A of the first imaging device 10A is different from the focal distance of the second main lens 11B of the second imaging device 10B. Otherwise, the configuration is similar to that of the solid state imaging device 110.

For example, the focal distance of the first main lens 11A is shorter than the focal distance of the second main lens 11B. The solid state imaging device 130 performs the ranging with higher precision by performing the imaging using the first imaging device 10A and the second imaging device 10B that have mutually-different focal distances.

Figure 13:
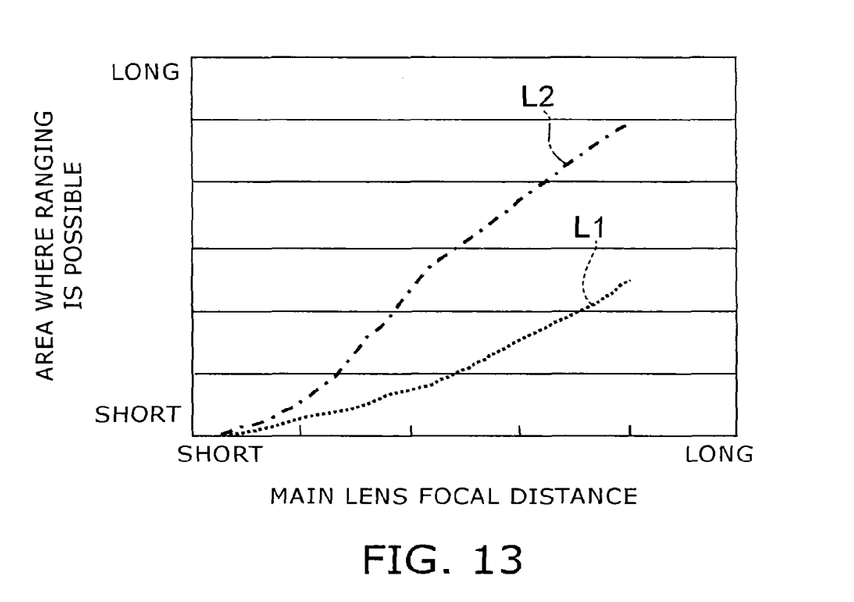
FIG. 13 illustrates the relationship between the focal distance and the area where ranging is possible.

FIG. 13 illustrates the relationship between the focal distance and the area where ranging is possible.

FIG. 13 shows the relationship between the focal distance of the main lens 11 and the area for which the estimation (the second calculation) of the distance can be performed using the parallax image group obtained via the microlens array 12. In FIG. 13, the horizontal axis is the focal distance of the main lens 11; and the vertical axis is the area where ranging is possible. Line L1 shown in FIG. 13 illustrates the area where ranging is possible in the case where the precision is relatively high compared to line L2. On the other hand, line L2 illustrates the area where ranging is possible in the case where the precision is relatively low compared to line L1.

For both lines L1 and L2, the area where ranging is possible depends on the focal distance of the main lens 11 in the distance estimation method using the parallax image group obtained via the microlens array 12. In other words, the area where ranging is possible increases as the focal distance of the main lens 11 increases.

The first imaging device 10A and the second imaging device 10B that have mutually-different focal distances are used in the solid state imaging device 130 by utilizing the relationship between the focal distance of the main lens 11 and the area where ranging is possible shown in FIG. 13.

By such a configuration, when acquiring the range image for a region having a relatively proximal distance by utilizing the distance estimation method using the parallax image group obtained from the microlenses, the image information acquired by an imaging device (e.g., the first imaging device 10A) having a short focal distance is utilized for a proximal region inside such a region; and the image information acquired by an imaging device (e.g., the second imaging device 10B) having a long focal distance is utilized for a distal region inside such a region. The focal distance of the main lens 11 has characteristics inversely proportional to the angle of view. Therefore, a wider angle of view can be covered by shortening the focal distance of the main lens 11. Thereby, the acquisition of distance information having high precision and a wide field of view is possible.

Although the first imaging device 10A that has a short focal distance and the second imaging device 10B that has a long focal distance are used in the solid state imaging device 130, three or more imaging devices 10 that have three or more different focal distances may be used.

According to the embodiments as described above, a solid state imaging device, a calculating device, and a calculating program that can perform ranging for a wide area with high precision can be provided.

Although the embodiment and modifications thereof are described above, the invention is not limited to these examples. For example, additions, deletions, or design modifications of components or appropriate combinations of the features of the embodiments appropriately made by one skilled in the art in regard to the embodiments or the modifications thereof described above are within the scope of the invention to the extent that the purport of the invention is included.

Range image cameras for capturing motion for use as input devices to operate games and appliances, etc., are examples of the fields of applications of the embodiments. There are many application examples of the range image information acquired by the embodiments such as the measurement of distances to vehicles at the front, back, left, and right, the detection of pedestrians, the detection of obstacles in the dead angle zone, airbags, parking assist, etc., for automobiles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A solid state imaging device, comprising:
    a first imaging device including
        a first optical system,
        a first imaging unit provided between the first optical system and an imaging position of the first optical system, the first imaging unit including a plurality of imaging pixels, and
        a second optical system provided between the first optical system and the first imaging unit, the second optical system including a first microlens array;
    a second imaging device provided to be separated from the first imaging device, the second imaging device including
        a third optical system,
        a second imaging unit provided between the third optical system and an imaging position of the third optical system, the second imaging unit including a plurality of imaging pixels, and
        a fourth optical system provided between the third optical system and the second imaging unit, the fourth optical system including a second microlens array; and
    a calculating unit configured to perform a first calculation and a second calculation, the first calculation including deriving a first distance from stereo disparity using a first image signal and a second image signal, the first image signal being of an object as obtained by the first imaging device, the second image signal being of the object as obtained by the second imaging device, the second calculation including deriving a second distance from a parallax image obtained via at least one selected from the first microlens array and the second microlens array, the calculating unit being configured to estimate a target distance based on at least one selected from the first distance and the second distance, wherein
    the calculating unit is configured to adopt the first distance as the target distance in response to the first distance exceeding a threshold, and adopt the second distance as the target distance in response to the first distance not being more than the threshold.

2. The device according to claim 1, wherein
    the calculating unit performs the first calculation for an overlapping region where a first imaging region of the first imaging device and a second imaging region of the second imaging device overlap, and
    the calculating unit performs the second calculation for one other region of the first imaging region and second imaging region other than the overlapping region.

3. The device according to claim 1, wherein
    the calculating unit performs the first calculation and the second calculation for an overlapping region where a first imaging region of the first imaging device and a second imaging region of the second imaging device overlap, and
    the calculating unit performs the second calculation for one other region of the first imaging region and second imaging region other than the overlapping region.

4. The device according to claim 1, wherein the calculating unit is configured to select one selected from the first distance and the second distance according to an instruction transmitted from an outside.

5. The device according to claim 1, wherein the calculating unit is configured to implement the second calculation and the first calculation in parallel.

6. The device according to claim 1, wherein an optical axis of the first optical system is non-parallel to an optical axis of the third optical system.

7. The device according to claim 1, further comprising a third imaging device disposed between the first imaging device and the second imaging device, the third imaging device including:
    a fifth optical system;
    a third imaging unit provided between the fifth optical system and an imaging position of the fifth optical system, the third imaging unit including a plurality of imaging pixels; and
    a sixth optical system provided between the fifth optical system and the third imaging unit, the sixth optical system including a third microlens array,
    the calculating unit being configured to further perform a third calculation including deriving a third distance from a parallax image obtained via the third microlens array, and configured to estimate the target distance based on the third distance.

8. The device according to claim 1, wherein a focal distance of the first optical system and a focal distance of the second optical system are different.

9. The device according to claim 1, further comprising a substrate configured to have the first imaging device, the second imaging device, and the calculating unit mounted on the substrate.

10. The device according to claim 1, wherein
    the first calculation is performed in a first interval, and
    the second calculation is performed in a second interval different from the first interval.

11. A calculating device comprising:
    calculating circuitry configured to perform a first calculation and a second calculation,
        the first calculation including deriving a first distance from stereo disparity using a first image signal and a second image signal, the first image signal being of an object obtained by a first imaging device, the second image signal being of the object obtained by a second imaging device, and
        the second calculation including deriving a second distance from a parallax image obtained via at least one selected from a first microlens array and a second microlens array,
    the calculating circuitry being configured to adopt the first distance as a target distance in response to the first distance exceeding a threshold, and adopt the second distance as the target distance in response to the first distance not being more than the threshold, the first imaging device including:
- a first optical system;
- a first imaging unit, implemented by circuitry, provided between the first optical system and an imaging position of the first optical system, the first imaging unit including a plurality of imaging pixels; and
- a second optical system provided between the first optical system and the first imaging unit, the second optical system including the first microlens array, the second imaging device being provided to be separated from the first imaging device and including:
- a third optical system;
- a second imaging unit, implemented by the circuitry, provided between the third optical system and an imaging position of the third optical system, the second imaging unit including a plurality of imaging pixels; and
- a fourth optical system provided between the third optical system and the second imaging unit, the fourth optical system including the second microlens array.

12. The calculating device according to claim 11, wherein the calculating circuitry is configured to perform
the first calculation for an overlapping region where a first imaging region of the first imaging device and a second imaging region of the second imaging device overlap, and
the second calculation for one other region of the first imaging region and second imaging region other than the overlapping region.

13. The calculating device according to claim 11, wherein the calculating circuitry is configured to perform
the first calculation and the second calculation for an overlapping region where a first imaging region of the first imaging device and a second imaging region of the second imaging device overlap, and
the second calculation for one other region of the first imaging region and second imaging region other than the overlapping region.

14. The calculating device according to claim 11, wherein the calculating circuitry is configured to select one selected from the first distance and the second distance according to an instruction transmitted from an outside.

15. The calculating device according to claim 11, wherein the calculating circuitry is configured to implement at least a portion of the second calculation and at least a portion of the first calculation in parallel.

16. The calculating device according to claim 11, wherein an optical axis of the first optical system is non-parallel to an optical axis of the third optical system.

17. A non-transitory computer-readable medium including computer executable instructions, wherein the instructions, when executed by a computer, cause the computer to perform a method, the method comprising:
performing a first calculation including deriving a first distance from stereo disparity using a first image signal and a second image signal, the first image signal being of an object obtained by a first imaging device, the second image signal being of the object obtained by a second imaging device;
performing a second calculation including deriving a second distance from a parallax image obtained via at least one selected from a first microlens array and a second microlens array; and
adopting the first distance as a target distance in response to the first distance exceeding a threshold, and adopting the second distance as the target distance in response to the first distance not being more than the threshold, the first imaging device including:
- a first optical system;
- a first imaging unit, implemented by circuitry, provided between the first optical system and an imaging position of the first optical system, the first imaging unit including a plurality of imaging pixels; and
- a second optical system provided between the first optical system and the first imaging unit, the second optical system including the first microlens array, the second imaging device being provided to be separated from the first imaging device and including:
- a third optical system;
- a second imaging unit, implemented by the circuitry, provided between the third optical system and an imaging position of the third optical system, the second imaging unit including a plurality of imaging pixels; and
- a fourth optical system provided between the third optical system and the second imaging unit, the fourth optical system including the second microlens array.

* * * * *